(12) United States Patent
Sasu (10) Patent No.: US 11,458,966 B2
(45) Date of Patent: Oct. 4, 2022

(54) METHOD AND DEVICE OF DETERMINING KINEMATICS OF A TARGET

(71) Applicant: Continental Automotive GmbH, Munich (DE)

(72) Inventor: Robert Sasu, Covasna (RO)

(73) Assignee: Continental Autonomous Mobility US, LLC, Auburn Hills, MI (US)

(*) Notice: Subject to any disclaimer, the term of this patent is extended or adjusted under 35 U.S.C. 154(b) by 79 days.

(21) Appl. No.: 16/858,497

(22) Filed: Apr. 24, 2020

(65) Prior Publication Data

US 2020/0255006 A1    Aug. 13, 2020

Related U.S. Application Data

(63) Continuation of application No. PCT/EP2018/073947, filed on Sep. 6, 2018.

(30) Foreign Application Priority Data

Oct. 26, 2017  (EP) .................................... 17465565

(51) Int. Cl.
*B60W 30/10*    (2006.01)
*B60W 30/18*    (2012.01)
(Continued)

(52) U.S. Cl.
CPC ...... *B60W 30/10* (2013.01); *B60W 30/18163* (2013.01); *B60W 40/04* (2013.01);
(Continued)

(58) Field of Classification Search
CPC ........... B60W 30/10; B60W 30/18163; B60W 40/04; B60W 2520/06; B60W 2520/105;
(Continued)

(56) References Cited

U.S. PATENT DOCUMENTS 7,102,496 B1 *  9/2006  Ernst, Jr. .......... G08G 1/096725
                                                      180/167
2003/0225519 A1 * 12/2003  Miyahara ........... B60K 31/0008
                                                      701/301

(Continued)

FOREIGN PATENT DOCUMENTS

CN      104269070 B    *   5/2017
DE      102016206550 A1    10/2017
WO      WO-0221156 A2  *   3/2002    ........ B60W 50/0097

OTHER PUBLICATIONS

Machine translation of CN-104269070-B (Year: 2017).*

(Continued)

*Primary Examiner* — Nicholas Kiswanto
*Assistant Examiner* — Mohamad O El Sayah (57) ABSTRACT

A method for determining kinematics of a target includes generating a measured trace of a target position, speed, and angle of a target relative to an ego vehicle. The radius of the curve that the target is taking is calculated, using the generated trace. A number of paths possible to be followed by the target are projected, expressed as abstract movement functions of a polynomial degree and using as input the calculated radius. At each further cycle, higher probabilities are added to the paths projected in a previous measuring cycle which are equal with the newly projected ones. The projected paths are kept if the radius remains the same as in the previous measuring cycle. The current kinematics values are computed by smoothing filtering as predicted kinematics values, which are compared with the kinematics values resulted from the projected paths, to determine the final kinematics values.

9 Claims, 7 Drawing Sheets

(51) Int. Cl.
 *B60W 40/04* (2006.01)
 *G05D 1/02* (2020.01)
 *G05D 1/00* (2006.01)

(52) U.S. Cl.
 CPC ....... *G05D 1/0214* (2013.01); *B60W 2520/06* (2013.01); *B60W 2520/105* (2013.01); *G05D 1/0088* (2013.01); *G05D 2201/0213* (2013.01)

(58) Field of Classification Search
 CPC .............. G05D 1/0214; G05D 1/0088; G05D 2201/0213
 See application file for complete search history.

(56) References Cited

U.S. PATENT DOCUMENTS

| | | | | |
|---|---|---|---|---|
| 2010/0017180 | A1* | 1/2010 | Randler | G01S 13/931 |
| | | | | 703/8 |
| 2010/0253493 | A1* | 10/2010 | Szczerba | G01S 13/723 |
| | | | | 340/435 |
| 2013/0231820 | A1* | 9/2013 | Solyom | G08G 1/22 |
| | | | | 701/23 |

OTHER PUBLICATIONS

X. Rong, Li. et al. Survey of Maneuvering Target Tracking. Part 1: Dynamic Models, IEEE Transaction on Aerospace and Electronic Systems, Oct. 2003, pp. 1333-1364, vol. 39, No. 4.
European Search Report dated May 3, 2018 for corresponding European Patent Application No. 17465565.4.

\* cited by examiner

METHOD AND DEVICE OF DETERMINING KINEMATICS OF A TARGET

CROSS REFERENCE TO RELATED APPLICATION

This application is a continuation of International application No. PCT/EP2018/073947, filed Sep. 6, 2018, which claims priority to European patent application No. 17465565.4, filed Oct. 26, 2017, each of which is hereby incorporated by reference.

TECHNICAL FIELD

The technical field relates generally to methods and devices for determining kinematics of a target, especially a vehicle, and may be used in autonomous driving systems.

BACKGROUND

For autonomous or semi-autonomous driving systems, one important factor for radar systems is to determine correctly and accurately the kinematics data—meaning position, speed, and heading—of a moving object set as a target. As radar sensors have a fair amount of noise in the detection of surrounding world, smoothing algorithms (Kalman-filter, polynomial regression, low-pass filter) are used to calculate the target object's parameters. These algorithms reduce the noise coming from the sensor, but the accuracy is never 100%, as a standard deviation always exists.

Nevertheless, when testing the blind spot detection functionality on its boundaries, for example, it is important to have an almost 100% accuracy—specific test scenarios allow only extremely small deviations (see "Blind Spot Detection System Confirmation Test for NCAP—Memorandum/Report—NHTSA—2015-0119-0025"). The test is done by comparing the data coming from a high precision GPS with objects which are exactly at the blind spot detection zone limit and even deviations with 0.1 s of late warnings are considered failures.

On the other side, the current radar hardware does not have such a great precision as a GPS module, and the noise coming from the radar must be reduced. Two degrees deviation in angle may exist in the best zone, this means 0.34 m deviation at 10 m. The noise can be reduced by Kalman filter to a certain degree, but not totally.

Furthermore, the standard deviation of an absolute heading calculation is even bigger than for position and speed, as it is harder to reduce the noise. If a stricter Kalman filter is used, then the maneuvers of the target object are missed entirely. For example, the absolute heading of a vehicle cannot change more than five degrees from one cycle to another. Moreover, the absolute heading of a vehicle is strictly constant/increases/decreases through a maneuver, it has only one type of change or no change at all. The same goes for acceleration, there is no fluctuation in real world such as in one cycle there is acceleration, in the next deceleration. Still, these fluctuations exist in radar measurement due to the noise the measurement brings, the smaller the noise the smaller the fluctuation, or the measurement is not real. Anyway, the change of parameters as position, heading, speed, acceleration is always simple in normal case scenarios and can be mapped by a set of linear function defined in a Markov-chain.

In this respect, the Korean patent KR101402206B1 discloses a multiple target tracking method, more particularly, a multiple target tracking method using distance information of a target, feature information-based Kalman filter, and joint probability data-association method. According to that document, a joint probability data-association method generates not only normalized distance squared distance information but also an effective matrix through dual conditions based on the correlation information of an image. By using this, the identification of other objects, which closely exist, can be possible and the complexity decreases as the number of cases which are taken into account decreases.

Another patent document, U.S. Pat. No. 5,633,642 A, discloses a radar method and a corresponding device. The method implies estimating an azimuth angle of each target object from determined variables of distance or range, relative speed and relative acceleration after Kalman filtering and separating out target objects having a physically impossible behavior (tracking and prediction). That is used to determine which target objects are located on a road-way occupied by a vehicle and which are the most dangerous thereof.

Nevertheless, using only smoothing algorithms to reduce the noise, predict and calculate the kinematics of a target object is not enough. In essence, none of the afore-mentioned inventions does not reflect how the objects are moving in the real world.

As such, it is desirable to present a system and method for highly increased accuracy on mapping the movement of target objects. In addition, other desirable features and characteristics will become apparent from the subsequent summary and detailed description, and the appended claims, taken in conjunction with the accompanying drawings and this background.

SUMMARY

According to a first aspect, the disclosure provides a method of determining a kinematic of a target in relation to an ego vehicle. The method includes selecting the target when it is detected in a predetermined sensing zone. The method also includes generating a trace of the target based on position, heading, speed and acceleration. The method further includes predicting a curve the target is taking and calculating a radius of the curve using the generated trace. The method also includes projecting n paths possible to be followed by the target, expressed as abstract movement functions of a polynomial degree p and using as input the calculated radius and, after having a trace of at least 2p−1 historical points, adding at each further cycle higher probabilities to the paths projected in a previous measuring cycle which are equal with the newly projected ones, and keeping the projected paths, if the radius remains the same as in the previous measuring cycle. The method further includes computing the current kinematics values by smoothing filter, as predicted kinematics values. The method also includes comparing the predicted kinematics values with the kinematics values resulted from the projected paths and determining the final kinematics values.

According to a second aspect, the disclosure provides a device of determining a kinematic of a target. The device includes an interface and an evaluation unit. The interface is adapted to receive sensor data related to the target. The evaluation unit is adapted to: predict a curve the target is taking and calculate a radius of the curve using the generated trace; project n paths possible to be followed by the target, expressed as abstract movement functions of a polynomial degree p and using as input the calculated radius, after having a trace of at least 2p−1 historical points; at each further cycle, add higher probabilities to the paths projected in a previous measuring cycle which are equal with the newly projected ones and keep the projected paths, if the radius remains the same as in the previous measuring cycle; compute the current kinematics values using an smoothing algorithm, as predicted kinematics values; compare the predicted kinematics values with the kinematics values resulted from the projected paths to determine the final kinematics data values.

According to a third aspect, the disclosure provides a vehicle equipped with a sensor system adapted to provide sensor data of surrounding of the ego vehicle, and a driving assistance system, able to receive signals from a device of determining a kinematic of a target.

According to one embodiment, a most probable path of a target vehicle is accurately chosen after comparing a predicted path with a projected path. Having this projected path, more precise kinematics values are computed for each of the two implied vehicles, so the method performs data validation in real-time. By doing this, almost all the noise coming from sensors can be eliminated, at least in usual, normal situations. Furthermore, as those projected paths are abstract models which reflect reality, further positions and movement of target can be predicted with higher precision.

The method also contributes to a better performance for advanced driving functions, like blind spot detection, lane change assist, front/rear traffic cross alert and so on.

According to an exemplary embodiment of the method, the step of determining the final kinematics values includes the condition that, if the standard deviation of the kinematics values associated to the projected paths is close to the standard deviation of the kinematics values associated to the predicted paths, then the kinematic parameters are those associated to the projected paths, otherwise the kinematics values are those associated with the predicted paths.

According to a particular embodiment of the method, the abstract movement functions are defined as Markov-chain matrices.

According to another embodiment of the method, the radius of the curve taken by the target is obtained by polynomial regression, using the generated trace.

According to another particular embodiment of the method, the smoothing filter used to compute the kinematics values associated to predicted paths is a Kalman filter.

According to another particular embodiment of the method, the smoothing filter used to compute the kinematics values associated to predicted paths is a low-pass filter.

According to an exemplary embodiment of the device, the evaluation unit is adapted to define the abstract movement functions as Markov-chain matrices.

According to another embodiment of the device, the evaluation unit is adapted to output the determined kinematics data to a driving assistance system, in order to assist functions like blind spot detection, lane change support, front and rear traffic cross alert.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
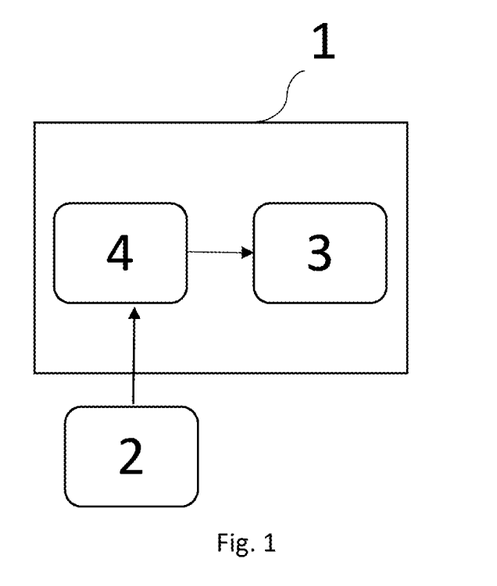
FIG. 1 is a schematic block diagram of a device of determining a kinematic of a target vehicle, according to an exemplary embodiment.

FIG. 1 shows a schematic block diagram of a device 1 for determining a kinematic of a target T. Target T may be, a motorized traffic participant (described as a rectangle), such as a motor vehicle, a motorcycle/bicycle, or the like.

Figure 2:
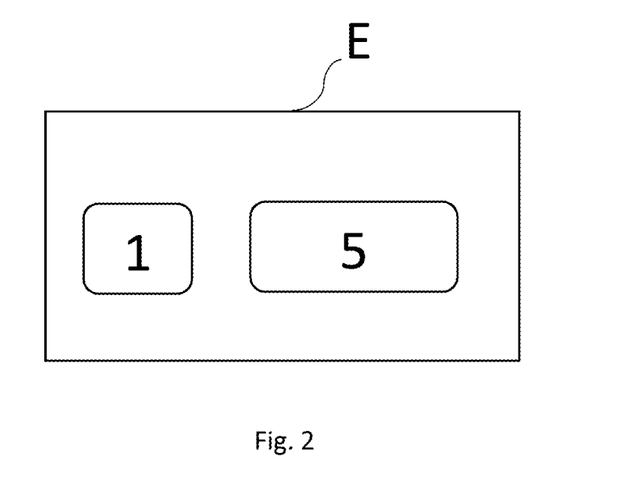
FIG. 2 is a schematic block diagram of a vehicle equipped with a device according to an exemplary embodiment.

A schematic view of an ego vehicle E equipped with such a device 1 and with a sensing system 2, as well as a driving assistance system 5 is illustrated in FIG. 2.

The device 1 comprises an interface 4 which is adapted to receive input data from any active form of remote sensing, such as radar, lidar, optic, ultrasonic or infrared sensors, for example, as well as GPS sensors. The received input data are related to a target external to said ego vehicle E, the target T being present in a predetermined scanning zone of the sensing system 2. In the illustrated examples, the traffic participant designated as target T in this description is a vehicle whose direction (angle) of movement over ground has been detected and history of measurement positions has been generated as a trace.

The device 1 includes an evaluation unit 3 adapted to use input data extracted from the trace of path and positions, and to further determine a kinematic of target T according to the method which is described in detail in the following section.

Figure 3A:
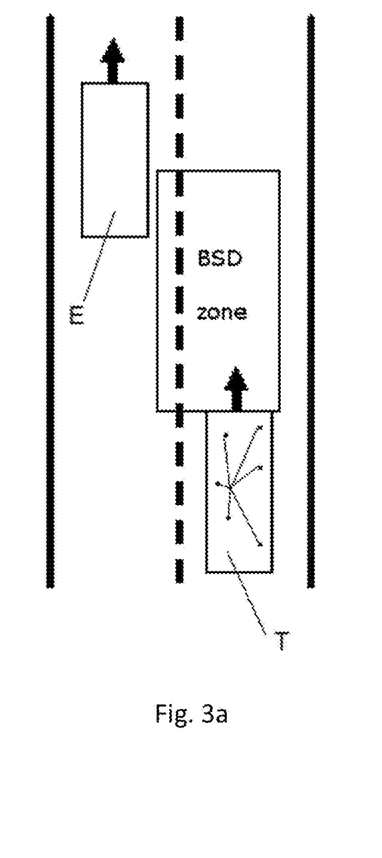
FIGS. 3a-3d are an illustrative example of a first road scenario with a target vehicle going straight with a constant speed at a certain distance behind an ego vehicle, and how measurement errors could influence the detection the target vehicle in the blind spot detection zone against the actual position.
Figure 3B:
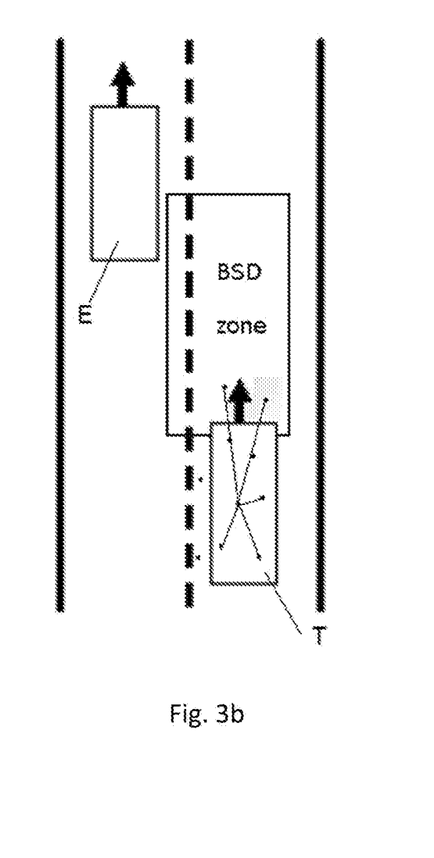
Figure 3C:
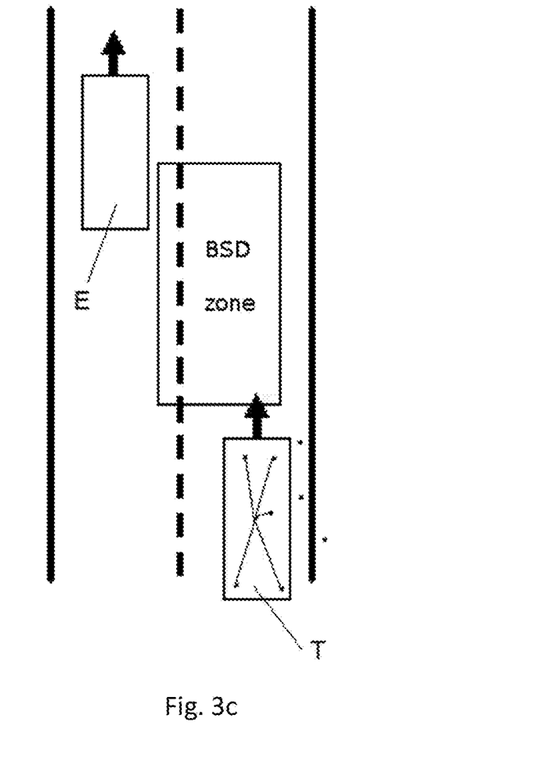
Figure 3D:
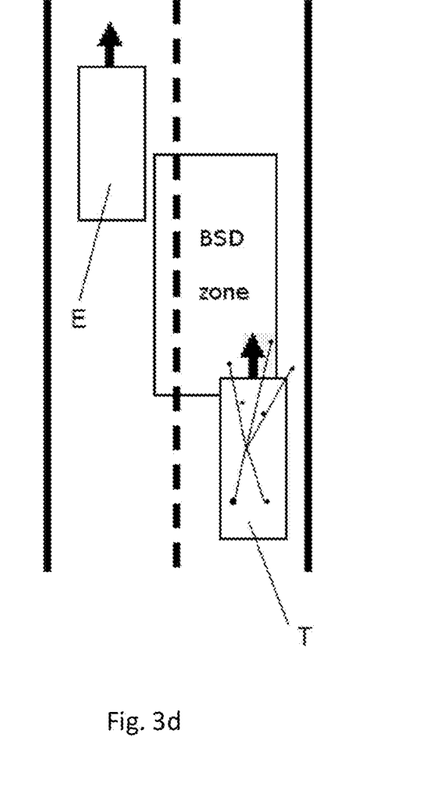

In order to illustrate the way target vehicle T is perceived by sensing systems 2, FIG. 3a shows an actual position of target vehicle T at the limit of the blind spot detection zone of ego vehicle E, for example, while FIG. 3b-3d show how the measurement errors could influence the detection of target vehicle T in or out the blind detection zone. In this first road scenario, target vehicle T is going straight with constant speed at a certain distance behind ego vehicle E, so there are absolute no fluctuations of kinematic parameters from one cycle to another, even the position of target vehicle T relative to ego vehicle E remains the same. However, due to the measurement noise, a current algorithm (Kalman filter, for example) will compute slight deviations in heading, position, speed, acceleration and so on. Even small fluctuations are enough to wrongly put target vehicle T in the blind spot detection zone, for example (see FIG. 3b, 3d), and give an alarm.

It is of interest, for the purpose of this disclosure, to discuss the cases requiring to map the kinematic parameters to a set of functions which reflect the reality. In reality there is noise in the motion of a vehicle; while driving, in 99% of the cases, the usual situation is that only simple movements are made, having a constant acceleration and a constant direction change. If these movements are expressed by mathematical functions, the exact movement of a target vehicle can be predicted and analyzed.

The concept consists into projecting at each cycle a set of paths expressed by movement functions of a polynomial degree n (which describe every kinematic parameter and make a Markov-chain model) from the trace and current parameters of target T and choosing the movement function which defines most accurately the actual path of the target, by comparing the projected paths with a path predicted by using existing smoothing algorithms.

In case none of the projected paths match with the predicted ones, the updated kinematics values from the smoothing algorithms will represent an unusual situation and thus the output data will be the one resulting from the smoothing algorithm. In the end, the goal is to reach a simplified solution where, using a minimal set of parameters, all the other variables/kinematics values to be calculated.

The set of functions which define the Markov-chain models associated to the kinematic of a vehicle (heading, acceleration, speed and position) comes as follow for a certain maneuver, and period of time t:

$$\begin{cases} \Phi(t) \\ a_{abs}(t) \\ a_x(t) = a_{abs}(t) * \cos(\Phi(t)) \\ a_y(t) = a_{abs}(t) * \cos(\Phi(t)) \\ v_{abs}(t) = v_{abs}(t_0) + v_{abs}(t - t_0) \\ v_x(t) = v_{abs}(t) * \sin(\Phi(t)) = v_x(t_0) + a_x(t - t_0) \\ v_y(t) = v_{abs}(t) * \cos(\Phi(t)) = v_y(t_0) + a_y(t - t_0) \\ x(t) = x(t_0) + v_x(t_0)*(t - t_0) + a_x(t) * \frac{(t - t_0)^2}{2} \\ y(t) = y(t_0) + v_y(t_0)*(t - t_0) + a_y(t) * \frac{(t - t_0)^2}{2} \end{cases} \quad (1)$$

where $\Phi(t)$, $a_{abs}(t)$ are independent functions describing heading and acceleration in absolute coordinates, and $$\begin{cases} \Phi(t) = \Phi_0, \text{ constant heading before maneuver, } t < t_1 \\ \Phi(t) = \Phi_0 + \alpha * t, \text{ first part of maneuver, } t < t_2 \\ \Phi(t) = \Phi(t_2) + \beta * t, \text{ first part of maneuver, } t < t_3 \\ \Phi(t) = \Phi_f, \text{ constant heading after maneuver, } t > t_3 \end{cases} \quad (2)$$

Next comes the simplified model for acceleration, describing a normal behavior, considering how an acceleration pedal is pressed over time, and how the pedal movement modifies the speed of the vehicle—almost linear changes.

$$\begin{cases} a_{abs}(t) = 0, \text{ no acceleration, } t < t_1 \\ a_{abs}(t) = \alpha * t, \text{ constantly accelerating/decelerating, } t < t_2 \\ a_{abs}(t) = a_{absFinal}(t), \text{ constant acceleration, } t < t_3 \\ a_{abs}(t) = \alpha * t, \text{ constantly acccelerating/decelerating, } t < t_4 \\ a_{abs}(t) = 0, \text{ no acceleration, } t > t_4 \end{cases} \quad (3)$$

The set of functions serialized, to be used in case of pass-by-pass/frame-to-frame computation looks like that:

$$\begin{cases} \Phi(t_n) \\ a_{abs}(t_n) \\ a_x(t_n) = a_{abs}(t_n) * \cos(\Phi(t_n)) \\ a_y(t_n) = a_{abs}(t_n) * \cos(\Phi(t_n)) \\ v_{abs}(t_n) = v_{abs}(t_{n-1}) + (a_{abs}(t_n) - a_{abs}(t_{n-1})) * (t_n - t_{n-1}) \\ v_x(t_n) = v_{abs}(t_n) * \sin(\Phi(t_n)) \\ v_y(t_n) = v_{abs}(t_n) * \cos(\Phi(t_n)) \\ x(t_n) = x(t_{n-1}) + (a_{abs}(t_n) - a_{abs}(t_{n-1})) * \frac{(t_n - t_{n-1})^2}{2} \\ y(t_n) = y(t_{n-1}) + (a_{abs}(t_n) - a_{abs}(t_{n-1})) * \frac{(t_n - t_{n-1})^2}{2} \end{cases} \quad (4)$$

Figure 4:
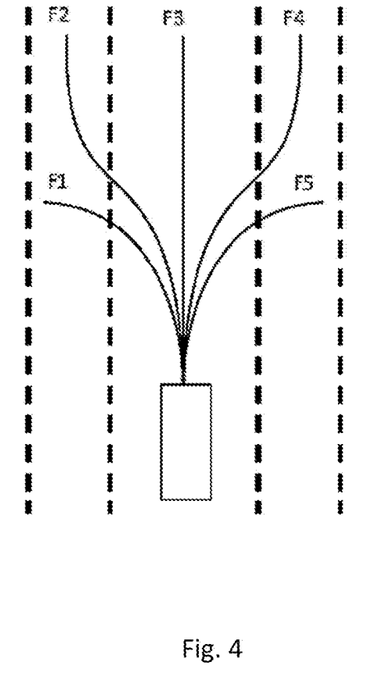
FIG. 4 is an illustration of possible maneuvers to be followed by a vehicle while running on a highway.

For every type of maneuver only the definition of the absolute heading functions differs. This heading function is only a simple first degree polynomial. It is based on observation and mapping of how a normal maneuver is done by a vehicle. For a better understanding of how this normal maneuvers are mathematically described, FIG. 4 shows five possible paths, expressed as functions F1, ..., F5, respectively.

Functions F1 and F5 describing constant turning to left/right are expressed by the following Markov-chain:

$$\begin{cases} \Phi(t) = 0, \text{ before maneuver, } t < t_1 \\ \Phi(t) = \alpha * t = \frac{v_{abs}(t)}{R} * t, \text{ where } R \text{ is the curve radius, } t < t_2. \\ \Phi(t) = \Phi_f, \text{ constant heading after maneuver, } t > t_3 \end{cases} \quad (5)$$

Functions F2 and F4 describing lane changing are expressed by the following Markov-chain:

$$\begin{cases} \Phi(t) = \Phi_0, \text{ before maneuver, } t < t_1 \\ \Phi(t) = \Phi_0 + \alpha * t = \Phi_0 + \frac{v_{absM}(t)}{R} * t, R \text{ is the curve radius,} \\ t < t_2, \ t < R * \arccos \frac{\left(1 \frac{d_{lane}}{2*R}\right)}{v_{absM}(t)} \\ \Phi(t) = 2 * \Phi_{max} - \alpha * t = 2 * \Phi_{max} - \frac{v_{absM}(t)}{R} * t, \ t < t_3, \\ \Phi_{max} = \arccos\left(1 - \frac{d_{lane}}{2*R}\right) \\ \Phi(t) = \Phi_0, \text{ constant heading after maneuver,} \\ t > t_3 = 2 * R * \arccos \frac{\left(1 \frac{d_{lane}}{2*R}\right)}{v_{absM}(t)} \end{cases} \quad (6)$$

Function 3 describing straight heading is described by the following equation:

$$\Phi(t) = 0 \quad (7).$$

Figure 7:
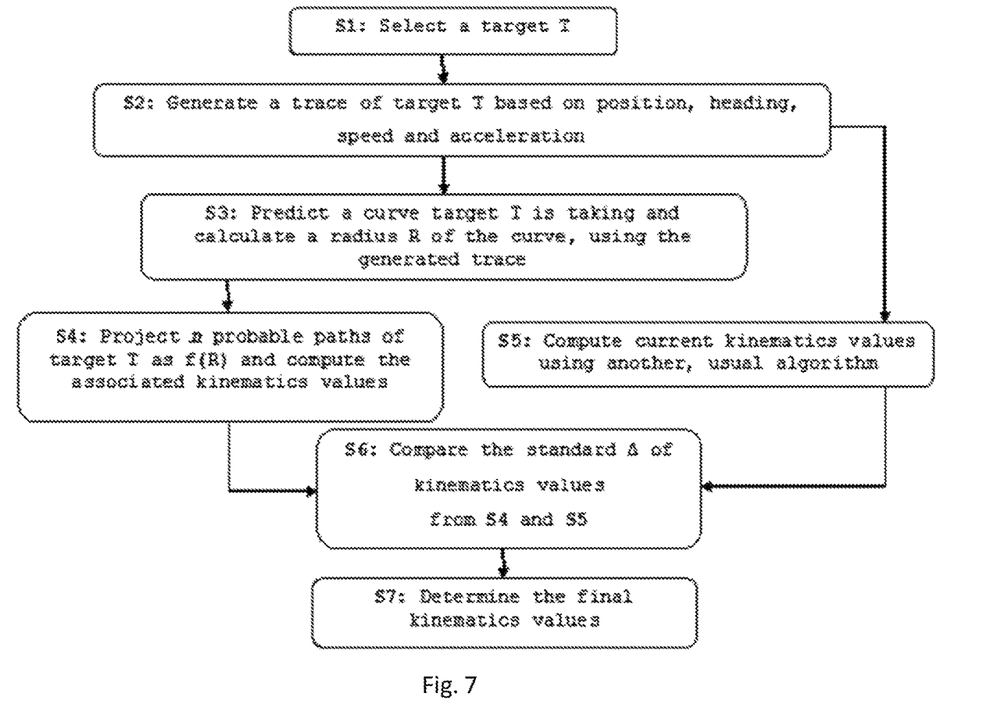
FIG. 7 is a flowchart of a method of determining a kinematic of a target, according to one exemplary embodiment.

An exemplary embodiment of the method of determining a kinematic of a target, applied for highway driving scenarios, is represented in FIG. 7. The method follows includes the steps:

S1: Select a target T when it is detected in the predetermined sensing zone;

S2: Generate a trace of the target based on position, heading, speed and acceleration;

S3: Predict a curve the target is taking and calculating a radius of the curve using the generated trace;

S4: Project n possible paths of target T as calculated functions (n=5 in case of highway—see FIG. 4) depending on the calculated radius and compute the associated kinematics values;

S4.0: once the target is selected and a trace of at least five historical points is detected, initialize the n projected paths as calculated functions;

S4.1: at each further cycle keep projecting the n paths as functions depending on the calculated radius; look at the previously projected paths and add higher probabilities to those which are equal with the newly projected ones;

S4.2: If the radius is the same as in the previous cycle, then target T is on one of the projected paths;

S5: Compute current kinematics values using an existing, usual algorithm (Kalman filter, low pass filter etc.);

S6: Compare the kinematics values calculated by the existing, usual algorithm with the kinematics values resulted from the projected paths from step S4;

S7: Determine the final kinematics values:

S7.1. If the standard deviation of the kinematics values associated to projected paths is close to the standard deviation of the kinematics values associated to predicted paths, then the kinematic parameters will be equal to the output of the projected path (as function)—eliminating all the noise;

S7.2. If the deviation of any of the paths is high, then use the kinematics values from the usual algorithm.

Figure 5:
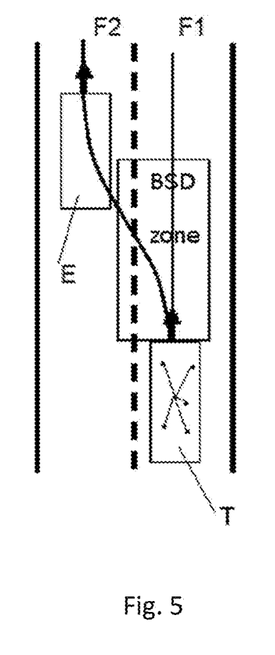
FIG. 5 is an example of actual position of straight-going target vehicle, calculated according to one exemplary embodiment of the method.
Figure 6A:
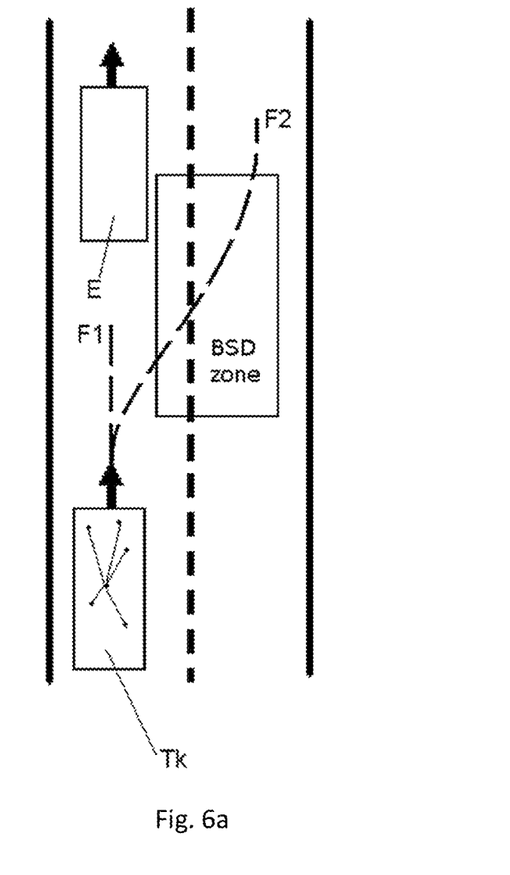
FIGS. 6a-6d are examples of actual heading and position of a target vehicle changing lanes, calculated according to the method, in comparison with the heading and positions computed by using a Kalman-filter.
Figure 6B:
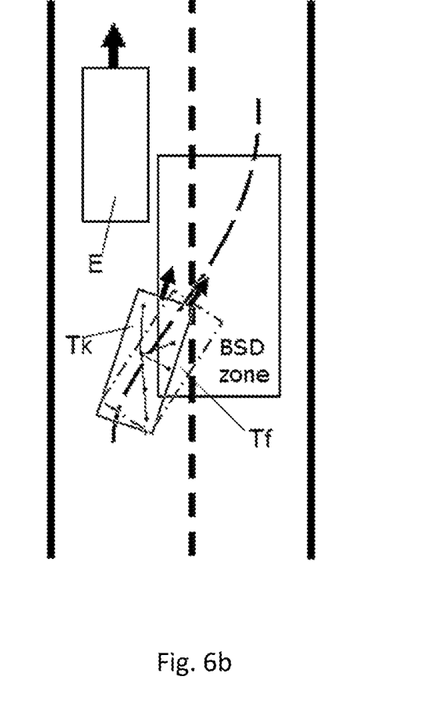
Figure 6C:
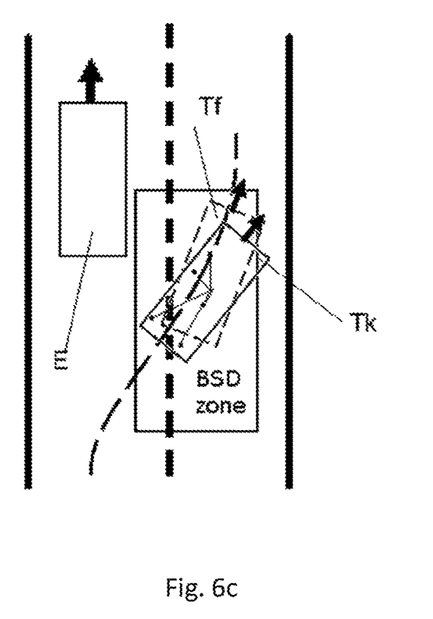
Figure 6D:
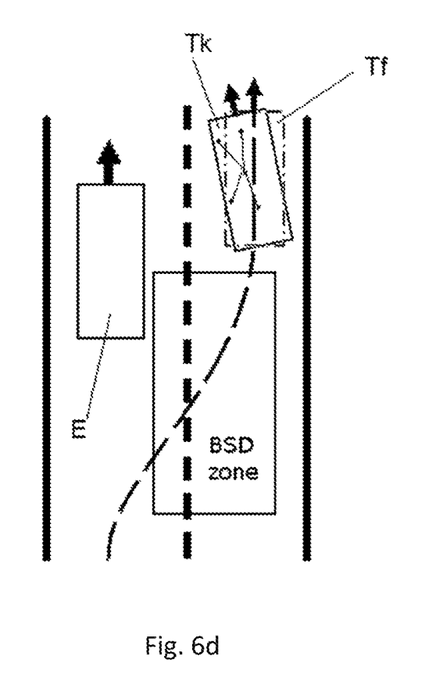

FIG. 5 shows an exemplary embodiment on how the method of determining a kinematic of a target computes the actual position of a straight-going target vehicle T on a two lane highway, a right lane and a left lane, respectively, in comparison with the position predicted by using Kalman-filter in global coordinates. Target vehicle T is running on the right lane, while ego vehicle E is running on the left lane. There are illustrated (see FIG. 3b-3d) three possible positions of target T behind ego vehicle E at the limit of the blind spot detection zone of ego vehicle E (meaning 12.1 m in axial direction and 3 m in transversal direction), as perceived according to the sensor data after Kalman filtering. Target vehicle T position as predicted by Kalman filter is illustrated by a rectangle Tk comprising the afferent cluster of points joined by lines (FIG. 5), while the actual position of target vehicle T, computed correctly after matching with afferent movement functions, is shown by a dotted rectangle Tf situated in the middle of the right lane. F1 is the function expressing the straight heading path of target vehicle T, F2 is the function expressing the lane changing path of target vehicle T, by turning left.

Target vehicle T is considered as having constant speed behind the ego vehicle E, the same speed as ego vehicle E. In this case, there are absolutely no fluctuations of kinematic parameters from one cycle to another, even the position of target vehicle T relative to ego vehicle E remains the same. The radius as extracted from the trace is calculated as being almost zero. By using polynomial regression, speed and acceleration are determined as constant as well, so there is no acceleration, only constant speed. A number of n paths which could be followed by target vehicle T as normal maneuvers are created as abstract movement functions (in this case two, namely F1—heading straight ahead and F2—lane changing), and the associated kinematics values are computed. Also, current values of kinematics are computed using the existing, normal algorithms (Kalman filter, low pass filter etc.) and compared with the kinematics values associated to the respective functions (projected paths). In the end, the chosen path will be the one of constant absolute heading, since it have the highest probability to be followed by target vehicle T. In this manner, speed, position, heading, acceleration is computed 100% correctly and accurately, eliminating all the noise and, most important, no warning is triggered.

Another exemplary embodiment of how the method of determining the kinematic of a target vehicle T, according to the invention, applies for a specific road scenario is shown in FIG. 6a-6d. The road scenario concerned in this case is that of lane changing from a current position of target vehicle T running behind ego vehicle E on the same lane (left lane, to be specific).

In this case, in the first cycle, as the Kalman filter predicts target vehicle T is going straight, the straight path is chosen as projected path; however, starting with the next cycle the lane changing maneuver is detected, and from the existing data the radius of the followed curve is determined. For the next few cycles target vehicle T is exactly on the predicted path which is the lane changing path (expressed as F2, as it is more important than the combination of left/right curve path expressing the overtaking maneuver), and as soon as target vehicle T finishes the maneuver, the path is computed correctly on the next lane, according to the method.

While certain embodiments of the present invention have been described in detail, those familiar with the art to which this invention relates will recognize various alternative designs and embodiments for practicing the invention as defined by the following claims.

What is claimed is:

1. A method of determining kinematics of a target in relation to an ego vehicle, the method comprising:
   selecting the target detected in a predetermined sensing zone;
   generating a trace of the target based on position, heading, speed, and acceleration of the target;
   predicting a curve the target is taking and calculating a radius of the curve using the generated trace;
   projecting n paths created as abstract movement functions of a polynomial degree p depending on the calculated radius, in response to the trace having at least 2p−1 historical points;
   at each further cycle, adding higher probabilities to paths projected in a previous measuring cycle which are equal with the newly projected ones and keeping the projected paths, if the radius remains the same as in the previous measuring cycle;
   computing predicted kinematics values by utilizing a smoothing filter with current kinematics values;
   comparing the predicted kinematics values with the kinematics values derived from the projected paths; and
   determining final kinematics values based on the comparison of predicted kinematics values with the kinematics values derived from the projected paths;
   wherein determining the final kinematics values comprises if the standard deviation of the kinematics values associated to the projected paths is close to the standard deviation of the kinematics values associated to the predicted paths, then the kinematic parameters are those associated to the projected paths, otherwise use the kinematics values associated to the predicted paths.

2. The method according to claim 1, further comprising defining the abstract movement functions as Markov-chain matrices.

3. The method according to claim 1, wherein the radius of the curve taken by target is obtained by polynomial regression using the generated trace.

4. The method according to claim 1, wherein the smoothing filter used to compute the kinematics values associated to predicted paths is a Kalman filter.

5. The method according to claim 1, wherein the smoothing filter used to compute the kinematics values associated to predicted paths is a low-pass filter.

6. A device for determining a kinematic of a target, comprising:
- an interface adapted to receive sensor data related to the target, as well as ego vehicle kinematics data such as heading, position, speed and acceleration of the target;
- an evaluation unit adapted to
   - predict a curve the target is taking and calculate a radius of the curve using the generated trace,
   - project n target paths expressed as abstract movement functions of a polynomial degree p depending on the calculated radius, after having a trace of at least 2p−1 historical points; at each further cycle, to add higher probabilities to the paths projected in a previous measuring cycle which are equal with the newly projected ones and to keep the projected paths, if the radius remains the same as in the previous measuring cycle,
   - compute current kinematics values using a smoothing algorithm, as predicted kinematics values,
   - compare the predicted kinematics values with the kinematics values resulted from the projected paths, and
   - determine final kinematics values;
   - wherein determining the final kinematics values comprises if the standard deviation of the kinematics values associated to the projected paths is close to the standard deviation of the kinematics values associated to the predicted paths, then the kinematic parameters are those associated to the projected paths, otherwise use the kinematics values associated to the predicted paths.

7. The device according to claim 6, wherein the evaluation unit is adapted to define the abstract movement functions as Markov-chain matrices.

8. The device according to claim 7, wherein the evaluation unit is adapted to output the determined kinematics data to a driving assistance system, as to assist functions including at least one of blind spot detection, lane change support, front traffic cross alert, and rear traffic cross alert.

9. A vehicle comprising:
- a sensor system adapted to provide sensor data of surroundings of the vehicle;
- a device for determining a kinematic of a target including
   - an interface adapted to receive sensor data related to the target, as well as ego vehicle kinematics data such as heading, position, speed, and acceleration of the target;
   - an evaluation unit adapted to
      - predict a curve the target is taking and calculate a radius of the curve using the generated trace,
      - project n target paths expressed as abstract movement functions of a polynomial degree p depending on the calculated radius, after having a trace of at least 2p−1 historical points; at each further cycle, to add higher probabilities to the paths projected in a previous measuring cycle which are equal with the newly projected ones and to keep the projected paths, if the radius remains the same as in the previous measuring cycle,
      - compute current kinematics values using a smoothing algorithm, as predicted kinematics values,
      - compare the predicted kinematics values with the kinematics values resulted from the projected paths, and
      - determine final kinematics values;
      - wherein determining the final kinematics values comprises if the standard deviation of the kinematics values associated to the projected paths is close to the standard deviation of the kinematics values associated to the predicted paths, then the kinematic parameters are those associated to the projected paths, otherwise use the kinematics values associated to the predicted paths; and
- a driving assistance system configured to receive signals from the device.

\* \* \* \* \*